UNITED STATES PATENT OFFICE.

EDGAR ARTHUR ASHCROFT, OF LONDON, ENGLAND.

EXTRACTION AND RECOVERY OF POTASSIUM OR POTASSIUM SALTS FROM POTASSIUM-BEARING MATERIALS.

1,320,193.     Specification of Letters Patent.     Patented Oct. 28, 1919.

No Drawing.     Application filed July 31, 1918. Serial No. 247,512.

*To all whom it may concern:*

Be it known that I, EDGAR ARTHUR ASHCROFT, a subject of the King of Great Britain, residing at 65 London Wall, in the city of London, England, have invented new and useful Improvements in the Extraction and Recovery of Potassium or Potassium Salts from Potassium-Bearing Materials, of which the following is a specification.

My invention relates to the extraction of potassium or potassium salts, from potassium-bearing materials, such as orthoclase (feldspar), muscovite, biotite (micas), alunite, leucite, or from cement-kiln dust, blast-furnace dust, wood-ashes, plant-ashes, beet-sugar residues, or any solid matter, or residues, recovered from solutions, if such matter, or residues, contain potassium in any form.

It is well known that such recovery of potassium is expensive and difficult (and in many instances is impossible) by any hitherto proposed method.

My improved process consists in the treatment of such potassium-bearing materials (alone, or admixed with carbon, or other reducing material) with chlorin gas at a suitable temperature while suspended in the fused medium.

Preferably the absorption of the chlorin is aided by the employment of a chlorin carrier, or catalyzer, and preferably carbon is mixed with the charge to aid the reduction. A sulfid, or other reducing substance, or compound, may be used instead of carbon.

The operation is preferably conducted in a converter or equivalent vessel, in which advantage is taken of the exothermic nature of the reactions to maintain the charge in a state of fusion and to regulate the temperature.

In carrying my improved process into effect I may aim primarily at converting the potassium content into normal potassium chlorid and then stopping the chlorin supply and lixiviating with water to recover the potassium salt.

The other contents of the material under treatment are then obtained as a solid insoluble residue which can be employed for any purpose to which it can be applied.

As an alternative to this method of working, I may continue the chlorin supply until other constituents of the material have been converted to chlorids and, in some cases, such chlorids may be distilled from the melt. This method of working is particularly useful when it is desired to separate a constituent (such as iron, or aluminum,) of the material which constituent is capable of forming a volatile chlorid from the remaining materials (for example, potassium chlorid and silica) whose chlorids are not volatilized at the temperature of working.

The general reaction aimed at by this process may be expressed thus:—

(1)   $2K_2O$ (plus the ordinary $SiO_2Al_2O_3$ content of feldspar)$+2Cl_2+C=$ $4KCl$ (plus the same silica and alumina)$+CO_2$.

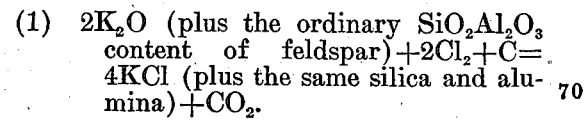

Although the potassium is found in such a great number and variety of materials their chemical compositions are, in the majority of cases, characterized by the leading feature that the potassium oxid is present as a base forming a compound (silicate aluminate, or the like,) with other metal oxids. This base is capable of being fractionally acted upon by chlorin in the aforesaid manner, while the other constituents remain unchanged in the form of insoluble compounds, or alternatively may also be fractionally converted to chlorids and volatilized.

The reaction (1) is strongly exothermic and its conclusion point is, in most cases, sharply and usefully indicated by the production of fumes of volatile iron, or aluminum, chlorid.

When a sulfate is present (as in the case of alunite) this is also decomposed as follows:—

(2)   $M_2SO_4+C+Cl_2=CO_2+SO_2+2MCl$

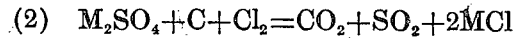

When a volatile chlorid is to be formed and volatilized the typical reaction may be written thus—

(3)   $2Fe_2O_3+3Cl_2+3C=2Fe_2Cl_6+3CO_2$

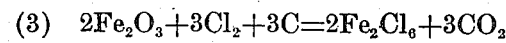

The volatile chlorid distils off leaving the fused medium in which the material is suspended, and the additional potassium chlorid formed by the reaction in the converter.

I have found, with regard to all the aforesaid reactions, that chlorin does not very readily react directly in the manner indicated by the equations and it is often difficult in the absence of an efficient catalyzer, or chlorin carrier, to carry out the reactions either rapidly, or completely. The case is however entirely different if a catalyzer, or carrier of chlorin, be employed, for instance a ferrous salt, or a salt of manganese, or other metal salt, or substance, having the like property of absorbing and passing on chlorin. This is the case if the catalyzer, or chlorin carrier, be employed, even in quite small quantities. A good example of this action is found in the case of using a ferrous salt, but of course I do not limit myself to the use of such iron salt, or any other particular catalysts, or chlorin carriers. The action in this case is that the ferrous salt (for example ferrous chlorid) absorbs chlorin with avidity even at moderate temperatures forming a ferric salt (for example $Fe_2Cl_6$) which is more reactive than is chlorin, its attack, both on oxides and metals, being complete and rapid even at quite low temperatures.

Some typical reactions with a catalyst, or chlorin carrier, may be written thus—

(4) $2Fe_2Cl_6 + 6K_2MO_4 + 3C =$
$2Fe_2O_3 + 12KCl + 6MO_2 + 3CO_2$
(5) $2Fe_2O_3 + 4Cl_2 + 3C = 4FeCl_2 + 3CO_2$ where M may, for instance, be either silicon, or aluminium.

(6) $2FeCl_2 + Cl_2 = Fe_2Cl_6$

Or, in the case of metals if present, (7) $Fe_2Cl_6 + M = 2FeCl_2 + MCl_2$

M in this case representing any metal capable of combining to form a chlorid.

The ferrous salt thus plays the part of a carrier of chlorin causing rapid and efficient reactions to take place which would not otherwise be the case. Analogous reactions take place with other materials which may be employed for this purpose, for example, (among many others) mangain what form the catalyzer, or chlorin cartacks most salts, or compounds, of iron and like metals, it is comparatively indifferent in what form the catalyzer, or chlorin carrier, is added as it is, in any case, rapidly converted to the reactive chlorids. A very useful and convenient catalyzer is ordinary iron sulfid in the proportion of three per cent. of the charge of raw material under treatment. Metallic iron, or iron oxids, are also efficient the iron being at once converted to ferrous chlorid and becoming usefully reactive. When the raw material under treatment contains iron it may be unnecessary to add iron, or other substance, as the iron present will act as a catalyzer, or chlorin carrier.

The temperature I prefer to employ for the reactions is between 800° and 1,100° centigrade, but I do not limit myself to any precise temperature.

I give the following example of the treatment of feldspar in accordance with my invention, but I, of course, do not limit myself to this example:

I take a common potash feldspar (orthoclase) as raw material, it containing, say, upward of 10 per cent. potassium oxid, for instance it may contain $K_2O$ 16.9 $Al_2O_3$ 18.4 and $SiO_2$ 64.7 and have the composition $K_2Al_2Si_6O_{16}$. This is finely ground and intimately mixed with charcoal also finely ground and in proportion to satisfy the foregoing reaction (1).

A bath of used potassium chlorid is placed in the converter with a little of the substance, or compound, which is to act as catalyzer, or chlorin carrier, and the mixture of ground feldspar and charcoal is fed thereto while chlorin gas is blown in. The mixture may be previously heated to any desired degree suitable to maintain the temperature of the converter normal.

After the requisite quantity of chlorin has been absorbed and all the potassium present has been converted to potassium chlorid, the converter charge is poured and the contents lixiviated with water leaving just sufficient hot fluid material in the converter to start the next blow. The process thus becomes a continuous one. The potassium chlorid is crystallized out of the lyes from lixiviation and is found to be remarkably pure. The lyes may then be used for further extractions.

The crystallized salt may be electrolyzed producing caustic potash (or carbonate, or metal potassium) and chlorin. This chlorin may be used again for the converter.

The process according to my invention constitutes a ready and economical means of obtaining potassium from materials which have not hitherto been practically worked or the extraction of potassium.

Instead of employing carbon in carrying out my invention I may employ any other agent capable of combining with oxygen and escaping, or separating. For instance, I may employ sulfur, in the form of sulfid capable of being decomposed by chlorin, (for example sodium potassium, zinc, lead, or iron, sulfid, or the like). The metal forms a chlorid (usually soluble in water in the subsequent lixiviation) and the sulfur combines with the oxygen of the raw material to form $SO_2$ and escapes.

I may, if preferred, omit the carbon, or the like, from these reactions, when oxygen gas in a free state will be evolved, but the exothermic quality of the reactions is improved by the use of a reducing agent. Instead of chlorin itself, I may use material which will yield chlorin, (for example HCl, or $S_2Cl_2$, or the like), and which can be employed as aforesaid.

All the foregoing calculations are made in terms of potassium oxid ($K_2O$).

In the following claims the term "chlorin gas" includes any suitable substance which will yield chlorin, and the term "converter" includes any suitable vessel.

What I claim is:

1. A process of extracting potassium or potassium salts which comprises the step of subjecting potassium-bearing materials to the action of chlorin gas while said materials are suspended in a fused medium.

2. A process of extracting potassium or potassium salts which comprises the step of blowing with chlorin gas a fused mobile bath containing potassium-bearing materials in a converter.

3. A process of extracting potassium or potassium salts which comprises the step of subjecting potassium-bearing materials to the action of chlorin gas while said materials are suspended in a fused medium, and in the presence of a reducing agent.

4. A process of extracting potassium or potassium salts which comprises the step of blowing with chlorin gas a fused mobile bath containing potassium-bearing materials and a reducing agent in a converter.

5. A process of extracting potassium or potassium salts which comprises the step of subjecting potassium-bearing materials and carbon to the action of chlorin gas while said materials are suspended in a fused medium.

6. A process of extracting potassium or potassium salts which comprises the step of blowing with chlorin gas a fused mobile bath containing potassium-bearing materials and carbon in a converter.

7. A process of extracting potassium or potassium salts which comprises the step of subjecting potassium-bearing materials and a catalyzer to the action of chlorin gas while said materials are suspended in a fused medium.

8. A process of extracting potassium or potassium salts which comprises the step of blowing with chlorin gas a fused mobile bath containing potassium-bearing materials and a catalyzer in a converter.

9. A process of extracting potassium or potassium salts which comprises the step of subjecting potassium-bearing materials to the action of chlorin gas while said materials are suspended in a fused medium, and in the presence of a reducing agent and a catalyzer.

10. A process of extracting potassium or potassium salts which comprises the step of subjecting potassium-bearing materials and a chlorin carrier to the action of chlorin gas while said materials are suspended in a fused medium.

11. A process of extracting potassium or potassium salts which comprises the step of subjecting potassium-bearing materials, carbon and a catalyzer to the action of chlorin gas while said materials are suspended in a fused medium.

12. A process of extracting potassium or potassium salts which comprises the step of blowing with chlorin gas a fused mobile bath in a converter, said bath containing potassium-bearing materials, carbon and a chlorin carrier.

In testimony whereof I have signed my name to this specification in the presence of two subscribing witnesses.

EDGAR ARTHUR ASHCROFT.

Witnesses:
G. F. TYRON,
L. WALTER.